L. D. SOUBIER.
MEANS FOR TRANSFERRING GLASS TO MOLDS.
APPLICATION FILED AUG. 26, 1918.
1,356,174. Patented Oct. 19, 1920.
2 SHEETS—SHEET 1.
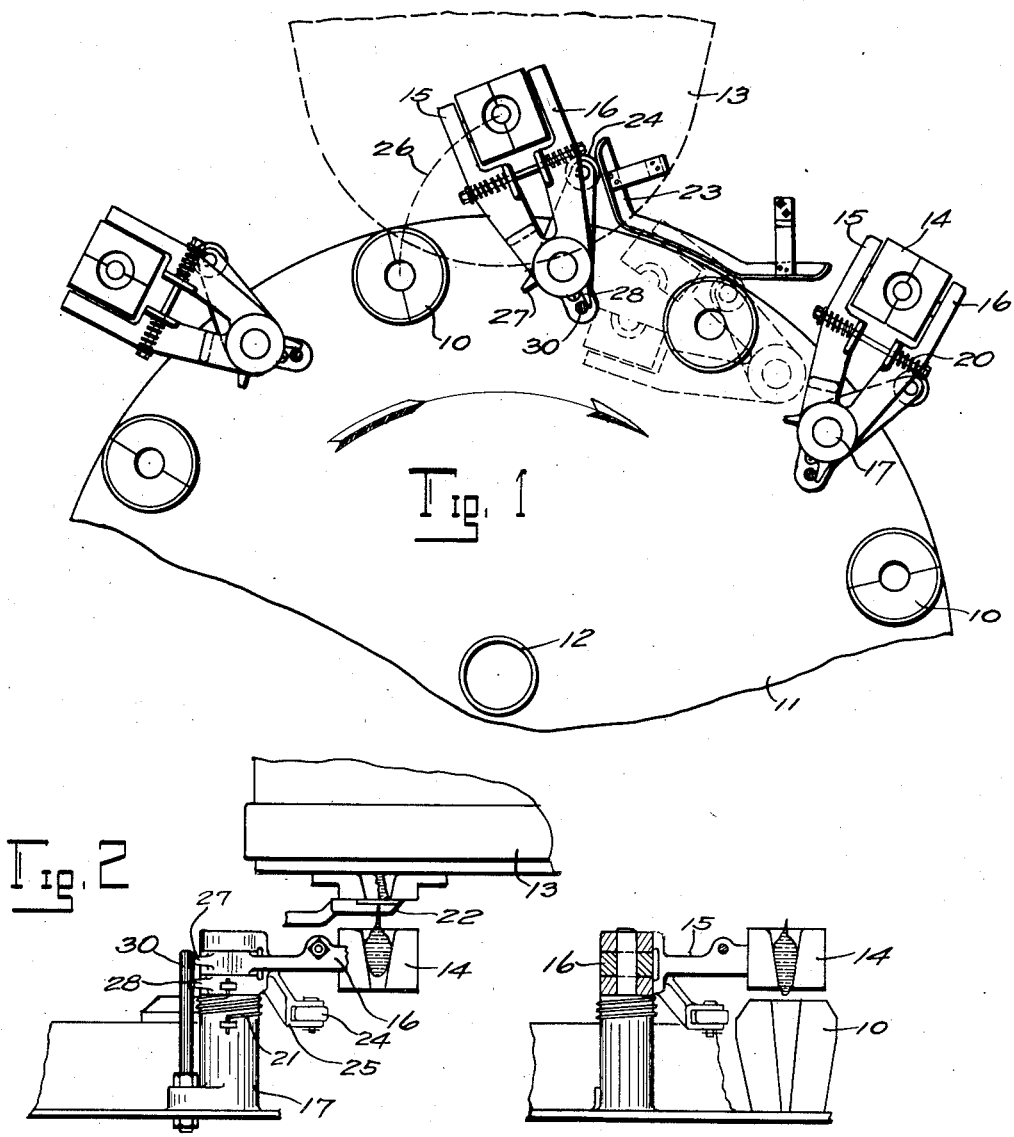
INVENTOR
LEONARD D. SOUBIER
By J. F. Rule
His attorney

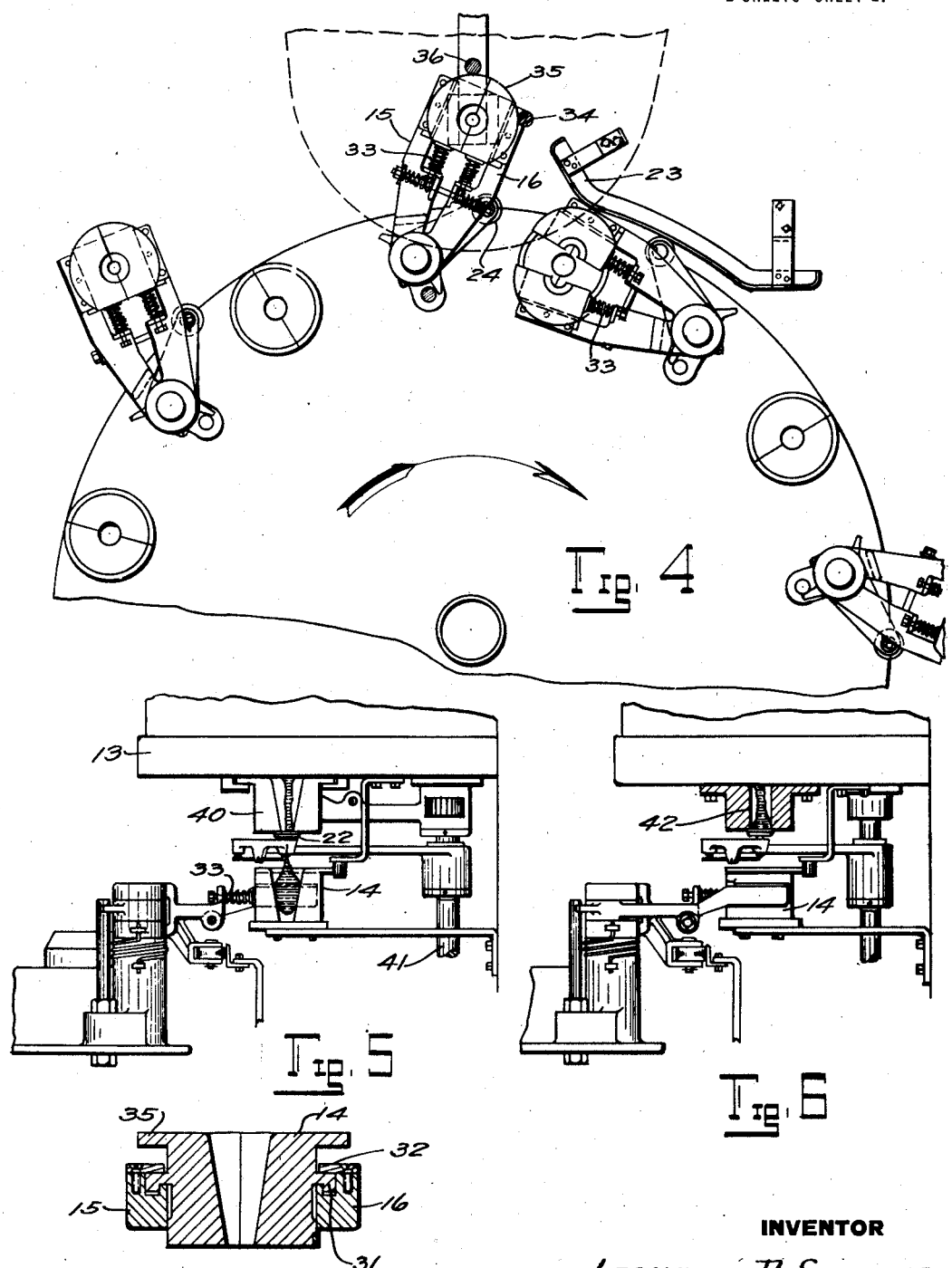

UNITED STATES PATENT OFFICE.

LEONARD D. SOUBIER, OF TOLEDO, OHIO, ASSIGNOR TO THE OWENS BOTTLE MACHINE COMPANY, OF TOLEDO, OHIO, A CORPORATION OF OHIO.

MEANS FOR TRANSFERRING GLASS TO MOLDS.

1,356,174. Specification of Letters Patent. Patented Oct. 19, 1920.

Application filed August 26, 1918. Serial No. 251,530.

*To all whom it may concern:*

Be it known that I, LEONARD D. SOUBIER, a citizen of the United States, residing at Toledo, in the county of Lucas and State of Ohio, have invented new and useful Improvements in Means for Transferring Glass to Molds, of which the following is a specification.

My invention relates to means for transferring charges of molten glass to the molds of a forming machine. An object of the invention is to provide a simple and practical form of transfer device mounted on a rotary mold-carrying machine to travel with the molds and arranged to be brought periodically to a charging position, as, for example, beneath a discharge orifice of the furnace to receive the gob or charge of glass and then to swing inward and deliver the glass to the mold.

In its preferred form, the glass transferring device comprises a divided cup carried by a pair of arms pivoted on the mold table so that the cup can swing outward and be brought to charging position as the machine rotates. As the mold table advances, the cup having received a charge, is cammed inward to a discharging position directly over a mold, the cup sections being then automatically separated to drop the charge into the mold.

A further feature of the invention consists in the provision of means adapting the transfer device for use on a continuously rotating machine. For this purpose suitable stops are provided to hold the transfer cup in register with the flow orifice while receiving a charge, the cup being mounted for sliding movement on its supporting arms to permit the latter to move with the machine while the cup is held at the charging position.

Other features of the invention will appear hereinafter.

In the accompanying drawings: Figure 1 is a partly diagrammatic plan view of one form of the invention.

Fig. 2 is a sectional elevation of the same.

Fig. 3 is a fragmentary view showing the transfer cup at or near its discharging position.

Fig. 4 is a view similar to Fig. 1, showing a modified construction adapted for use with a continuously rotating machine.

Fig. 5 is a part sectional elevation of the same with the transfer cup in receiving position, this view showing a gob forming cup above the transfer cup.

Fig. 6 is a similar view of a modified construction.

Fig. 7 is a sectional elevation of the transfer cup.

Referring to Figs. 1 to 3, molds 10 are arranged in a ring on the mold carriage or table 11 of a glass forming machine, rotated step by step about a central column 12. The charges of molten glass may be supplied from a continuous melting tank having a boot or extension 13 provided with a discharge orifice in the bottom thereof, through which the glass flows in a continuous stream. Transfer cups 14 are provided for receiving the flow of glass, forming it into gobs and transferring it to the molds 10, there being one transfer cup for each mold.

Each cup comprises two sections carried on arms 15 and 16, the arms being mounted for pivotal movement on a vertical shaft or standard 17 on the mold table. The cup sections may be separated to discharge the glass but are normally held together by springs 20. The arms 15 and 16 are normally swung outwardly to hold the cup beyond the periphery of the mold table by means of a torsion spring 21 connected at one end to the arm 15 and at its other end to the post 17.

Each step rotation of the machine brings a cup to receiving position beneath the flow opening. A knife 22, which forms a temporary support for the oncoming stream during the interval between the removal of one cup and the positioning of the next cup beneath the flow, is withdrawn when a cup is brought to charging position and permits the glass to flow directly into the cup. The inner walls of the cup are preferably tapered, the lower end of the cup being open. The glass as it accumulates is supported by the tapered walls and shaped into a gob of the form best adapted for entering the mold.

When a gob has accumulated in the cup the knife 22 operates to sever it from the oncoming stream. The mold table then advances one step. During this advance a cam 23 engages a roll 24 on an arm 25 connected with the arm 15 and swings the cup inward along the arc 26 (Fig. 1) to a discharging position over the mold 10. As the cup comes to this position a lug 27 on the arm 16 strikes a stop 30 and arrests the arm 16. The arm 15 continues its inward movement a sufficient distance to separate the cup sections, as indicated in broken lines (Fig. 1), and permits the gob to drop into the mold directly beneath. The transfer cup is then swung outward by the spring 21 until arrested by a lug 28 on the arm 15 striking the stop 30. The cam is shaped to allow a gradual outward movement of the cup. As the transfer cup is only over the mold for a short period it does not interfere with the blowing head or other mechanism coöperating with the molds.

Figs. 4 to 7 illustrate a modification particularly adapted for use with a continuously rotating machine. In this construction the cup sections are mounted for sliding movement radially inward along the arms 15 and 16. For this purpose ribs 31 (Fig. 7) on the cup sections are slidable in corresponding grooves in the arms 15 and 16. Removable plates 32 hold the parts in assembled relation. Springs 33 hold the cup sections normally at the limit of their outward movement.

As a cup is brought to receiving position by the rotation of the machine it is arrested by a stationary stop 34 which engages a circular disk or flange 35 formed on the cup. The cup is thus held against forward movement while the mold table advances. At the same time a second stop 36 engages the disk 35 at a point which prevents the cup from moving outward beyond its position in register with the flow as the mold table advances. The continued movement of the mold table after the cup is arrested by the stop 34, swings the arms 15 and 16 toward a position radial to the mold table. This would shift the cup outward or toward the furnace and out of register with the flow opening, but such movement is prevented by the stop 36. The movement of the transfer cup while in receiving position is simply one of rotation about its own center, that is, the center of the disk 35.

When the roll 24 strikes the cam 23 the transfer cup is swung inwardly and discharged into the mold, as before explained, the cup sections being moved radially outward by the springs 33 after passing beyond the stop 36.

The glass may be accumulated and formed into a gob before it is dropped into the transfer cup 14, if desired. Fig. 5 illustrates a construction adapted for this operation. As here shown, a gob forming cup 40 is arranged directly beneath the flow opening in the boot 13, said cup being made in separable sections similar to the cup 14. The glass accumulates in the cup 40 and forms a gob. The cup sections are then separated by means of a cam on a cam shaft 41 and thereby permitting the gob to drop into the cup 14. The knife 22 which may also be controlled from the cam shaft 41 then severs the gob.

In the modification shown in Fig. 6 the glass accumulates in a chamber 42 while the cups 14 are being shifted. This chamber 42, when the knife is withdrawn, forms a channel through which the glass flows directly into the cup 14, the channel being of greater diameter than the stream of glass flowing therethrough.

Variations may be resorted to without departing from the spirit and scope of my invention.

What I claim is:

1. The combination with a glass forming machine comprising molds arranged to travel in a horizontal path, of means for supplying a stream of molten glass, and transfer cups individual to the molds and traveling therewith, said cups arranged to be brought successively beneath said stream to receive charges of glass, and means to actuate said cups to transfer the glass to the molds.

2. The combination with means to supply a stream of molten glass of a traveling mold, a transfer cup traveling therewith, and means to shift said cup from a position beneath the stream of glass to a position over the mold and discharge the glass into the mold.

3. The combination with a traveling mold, of a transfer cup traveling therewith, means to shift said cup from a position to receive a charge of glass to a position over the mold to discharge the glass into the mold, said cup being open at its upper end to receive its charge and comprising horizontally separable sections, and means to separate said sections and drop the charge into the mold when at said discharging position.

4. The combination with a rotary mold table, of molds thereon, transfer cups, arms mounted on the mold table and carrying said cups, means to swing said arms horizontally on said table and thereby swing said cups from a receiving position beyond the mold table to a discharging position over the molds, said cups being open at their upper ends to receive charges of glass, and means to cause the cups to drop the charges into the molds.

5. The combination with a rotary mold table, of molds thereon, transfer cups, arms mounted on the mold table and carrying said cups, means to swing said arms horizontally on said table and thereby swing said cups from a receiving position beyond the mold table to a discharging position over the molds, and automatic means to open said cups and drop charges of glass therefrom into the molds.

6. The combination with a glass forming machine comprising a mold arranged to revolve about a vertical axis, of a transfer receptacle open at its upper end to permit a charge of glass to be dropped therein, a carrier for said receptacle mounted on said machine and movable relatively therewith to carry said receptacle from a receiving position to a discharging position over the mold, and means to cause said charge to drop from the receptacle into the mold.

7. The combination with a glass forming machine comprising a mold traveling in a closed path, of a transfer receptacle carried with the mold and open at the top to permit a charge of glass to be dropped therein, and means to shift said receptacle relative to the mold to bring it periodically to a position at which it receives its charge and to shift it to a discharging position over the mold and cause the glass to drop therefrom into the mold.

8. The combination with a rotating mold carrying machine, of a swinging carrier thereon, a transfer cup on said carrier open at its upper end to receive charges of glass and comprising separable sections, and automatic means to periodically swing said carrier and thereby move the receptacle from a receiving to a discharging position and separate said sections and drop the charge when at the discharging position.

9. The combination of a rotary glass forming machine, a mold thereon, a transfer cup having its upper end open to permit a charge of glass to be dropped therein and comprising separable sections, a carrier for said cup mounted on the machine to revolve therewith, whereby the cup is brought periodically to position to receive its charge, and automatic means to actuate said carrier and shift the cup to a discharging position over the mold and then separate the cup sections and permit the charge to drop into the mold.

10. The combination of a rotary glass forming machine comprising a mold, a transfer cup by which charges of glass are transferred to the mold, a carrier for said cup mounted to travel with the mold, said carrier comprising a pair of arms to which the cup sections are respectively connected, means to shift said carrier to move the cup to a discharging position over the mold, and a stop arranged to arrest one of said arms as the cup reaches said discharging position, and permit a further movement of the other arm to thereby separate the cup sections.

11. The combination of a rotary mold table, a mold thereon, a sectional transfer cup, a carrier therefor comprising arms to which the cup sections are respectively connected, said carrier pivoted on the mold table, a spring to normally hold said carrier in a position in which the cup is positioned beyond the mold table and periodically brought to a charging position as the mold table rotates, a stationary cam arranged to swing said carrier inward and thereby bring the cup over the mold, and a stop on the mold table to arrest one arm of the carrier and permit a further movement of the other arm to thereby separate the cup sections and drop the charge of glass into the mold therebeneath.

12. The combination with a rotary glass forming machine including a mold, of a transfer receptacle mounted to rotate with the machine and thereby periodically be brought to a charging position, and a stop in the path of said receptacle to arrest and hold it at the charging position while permitting a continued movement of the machine, and means to then move said receptacle relative to the machine to a discharging position and cause it to discharge into the mold.

13. The combination with a rotary glass forming machine comprising a series of revolving molds, of transfer receptacles individual to said molds and mounted on the machine to revolve with the molds, said receptacles thereby being brought successively to a charging station, and a stationary stop in the path of the receptacles to arrest each receptacle at said station and hold it at the station for a predetermined time interval while the molds continue their revolution.

14. The combination with a rotary glass forming machine comprising a series of revolving molds, of transfer receptacles individual to said molds and mounted on the machine to revolve with the molds, said receptacles thereby being brought successively to a charging station, a stationary stop in the path of the receptacles to arrest each receptacle at said station and hold it at the station for a predetermined time interval while the molds continue their revolution, and automatic means to move each receptacle to a discharging position and discharge it into its mold.

15. The combination of a rotary glass forming machine comprising a mold carriage and a mold thereon, a transfer receptacle, a carrier on which the receptacle is carried, said carrier pivotally mounted to swing relatively to the mold carriage and also to revolve therewith, a stop in the path of the receptacle, and a lost motion connection between said receptacle and carrier, permitting a limited movement of the carrier with the mold carriage and relative to the receptacle while the receptacle is in its arrested position.

16. The combination with a continuously rotating glass forming machine, of a transfer receptacle for transferring charges of glass to a mold on the machine, a carrier for said receptacle pivotally mounted on the machine, said receptacle having a limited sliding movement toward and from the pivot of said carrier, and stops in the path of said receptacle, the latter having an arc shaped surface to engage said stops, whereby the cup is permitted a rotary movement while in contact with said stops as the machine and said carrier continue to move.

17. A glass forming machine comprising in combination, a continuously rotating frame, a carrier pivoted at one end to the frame to swing thereon, a cup supported on the outer end of said carrier, a stop, and means providing an arc shaped surface concentric with the cup arranged to engage said stop as the cup travels with the machine frame, thereby arresting the cup and causing it to swing about its axis of rotation as the pivoted end of the carrier continues its advance with the machine frame.

18. A glass forming machine comprising in combination, a continuously rotating frame, a carrier pivoted at one end to the frame to swing thereon, a cup supported on the outer end of said carrier, a stop, and means providing an arc shaped surface concentric with the cup arranged to engage said stop as the cup travels with the machine frame, thereby arresting the cup and causing it to swing about its axis of rotation as the pivoted end of the carrier continues its advance with the machine frame, said cup being mounted for movement relative to its carrier toward and from the carrier pivot to compensate for the varying distance between the cup and said pivot while the cup is in its arrested position.

19. The combination with a rotary mold table, of an annular series of molds thereon, carriers pivotally mounted on the mold table and projecting outward beyond the periphery of the table, cups mounted on the outer ends of said carriers to receive charges of molten glass, automatic means to swing said carriers inward and bring the cups over the molds, and means to actuate the cups while over the molds and cause them to drop the charges of glass into the molds.

20. The combination with a rotary mold table, of an annular series of molds thereon, carriers pivotally mounted on the mold table and projecting outward beyond the periphery of the table, cups mounted on the outer ends of said carriers to receive charges of molten glass, a stationary cam operable to swing the carriers inward and bring the cups over the molds, said cups comprising separable sections, and automatic means to separate said sections when over the molds and permit the charges of glass to drop into the molds.

21. The combination of a rotary mold table, a mold thereon, a pair of swinging arms pivotally mounted on the mold table, a cup comprising separable sections connected respectively to said arms, a spring to hold said sections together, a stationary cam arranged to swing said arms as the mold table rotates and thereby bring the cup over the mold, and a stop in the path of one of said arms in position to cause a separation of the cup sections when over the mold.

Signed at Toledo, in the county of Lucas and State of Ohio, this 22nd day of August, 1918.

LEONARD D. SOUBIER.